United States Patent
Ohga

(10) Patent No.: US 8,411,944 B2
(45) Date of Patent: Apr. 2, 2013

(54) COLOR PROCESSING APPARATUS AND METHOD THEREOF

(75) Inventor: Manabu Ohga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 912 days.

(21) Appl. No.: 12/534,508

(22) Filed: Aug. 3, 2009

(65) Prior Publication Data

US 2010/0046834 A1  Feb. 25, 2010

(30) Foreign Application Priority Data

Aug. 21, 2008  (JP) .................................. 2008-213224

(51) Int. Cl.
*G09K 9/00* (2006.01)

(52) U.S. Cl. .......................................................... 382/167

(58) Field of Classification Search .......... 382/162–164, 382/167, 274; 358/504, 518
See application file for complete search history.

(56) References Cited

U.S. PATENT DOCUMENTS

| | | | |
|---|---|---|---|
| 6,850,640 B2 | 2/2005 | Ohga | |
| 8,115,978 B2 * | 2/2012 | Kawai | 358/518 |

FOREIGN PATENT DOCUMENTS

| | | |
|---|---|---|
| JP | 2002-042132 | 2/2002 |
| JP | 2002-204372 A | 7/2002 |
| JP | 2006-215756 | 8/2006 |
| JP | 2007-174126 A | 7/2007 |
| JP | 2007-081683 A | 3/2008 |

OTHER PUBLICATIONS

The above references were cited in a Jul. 13, 2012 Japanese Office Action, which is enclosed without English Translation, that issued in Japanese Patent Application No. 2008-213224.
The above reference was cited in an Oct. 22, 2012 Japanese Office Action, which is enclosed without an English Translation, that issued in Japanese Patent Application No. 2008-213224.

* cited by examiner

*Primary Examiner* — Duy M Dang
(74) *Attorney, Agent, or Firm* — Cowan, Liebowitz & Latman, P.C.

(57) ABSTRACT

A spatial CAM forward conversion unit forward-converts XYZ data of the input side into JCh data based on input viewing condition parameters including parameters, which are used to determine field sizes of an input image based on the viewing angle. A Gamut mapping algorithm unit converts the JCh data into those in a color reproduction range of an output device by gamut mapping according to the color reproduction range of the output device. A spatial CAM inverse conversion unit inversely converts the JCh data in the color reproduction range of the output device into XYZ data of the output side based on output viewing condition parameters including parameters, which are used to determine field sizes of an output image based on the viewing angle.

9 Claims, 14 Drawing Sheets

COLOR PROCESSING APPARATUS AND METHOD THEREOF

BACKGROUND OF THE INVENTION

1. Field of the Invention

The present invention relates to color processing for implementing color matching between different viewing conditions.

2. Description of the Related Art

FIG. 1 is a view showing the definition of a field of view of a human in a color appearance model.

The color appearance model is designed to correctly predict the color appearance of a human when a color patch having a viewing angle of 2° is given. In general, a CIE 1931 standard calorimetric observer is applicable within the viewing angle range from 1° to 4°, and this viewing angle range is distinguished to a stimulus 61 within 2° and a proximal field 62 within 4°. A field within the viewing angle range from 4° to 10° outside the proximal field 62 is called a background 63, and a field around the background 63 is called a surround field 64. Furthermore, a viewing field including all of the stimulus 61, proximal field 62, background 63, and surround field 64 is called an adapting field.

As a typical color appearance model, the CIECAM02 is known, and this model can set the following viewing condition parameters:

La: the absolute luminance [cd/m$^2$] (normally, 20% of an absolute luminance Lw of a white point of the adapting field) of the adapting field, XYZ: the relative XYZ values of a color patch, XwYwZw: the relative XYZ values of the white point, Yb: the relative luminance of the background, and surround condition: Average Surround, Dim Surround, or Dark Surround.

Note that the surround condition is "Average" when the relative luminance in the surround field is 20% or more of the white point in the adapting field, "Dim" when it is less than 20%, and "Dark" when it is nearly 0%.

Since the color appearance model is derived from experimental results using color patches of solid colors, viewing condition parameters to be applied to an image including a plurality of mixed colors are not settled. Since neutral gray is 20% of the luminance of the white point, it is a common practice to set 20% of the absolute luminance Lw of the white point in the adapting field as the relative luminance Yb of the background.

When the color appearance model is applied to an image, it is a common practice to apply one set of viewing condition parameters to all pixels. However, a problem remains in that the visual effect of a solid color and background expressed on a rasterized image cannot be reflected on the color matching result by the application of one set of viewing condition parameters to all pixels.

In other words, it cannot be said that color matching with respect to the image resolution and viewing distance of the input and output sides (to be referred to as spatial color matching hereinafter) has been performed in a conventional system. To solve this type of problem, iCAM proposed by Fairchild, reference 1 (Japanese Patent Laid-Open No. 2002-042132), and reference 2 (Japanese Patent Laid-Open No. 2006-215756) propose spatial color matching with respect to the impact of surrounding pixels.

iCAM merely experimentally defines about 1/4 of an input image size as a low-pass filter, and does not consider the viewing distances of the input and output sides or the image resolution of the output side. The technique of reference 1 defines a field corresponding to a field of view of 10° of the output side with respect to an input image and considers the image resolution and viewing distance of the output side, but it sets the image resolution and viewing distance of the input side to be the same values as those of the output side. The technique of reference 2 defines a field corresponding to a field of view of 10° of the input side with respect to an input image and considers the image resolution and viewing distance of the input side, but it does not consider the image resolution and viewing distance of the output side. The techniques of iCAM and references 1 and 2 do not perform spatial color matching that considers the color reproduction range of an output device.

SUMMARY OF THE INVENTION

In one aspect, a method of performing spatial color matching that converts an image of an input side under input viewing conditions into an image of an output side under output viewing conditions, which is carried out in an information processing apparatus, the method comprising the steps of: forward-converting the image of the input side into an image in a color appearance space of a human based on the input viewing conditions including parameters, which are used to determine field sizes of an input image based on a viewing angle; converting the image in the color appearance space into an image in the color appearance space within a color reproduction range of an output device by gamut mapping according to the color reproduction range of the output device; and inversely converting the image in the color appearance space within the color reproduction range of the output device into the image of the output side based on the output viewing conditions including parameters, which are used to determine field sizes of an output image based on a viewing angle.

According to this aspect, spatial color matching that considers the resolution and viewing distance of an input image, and those of an output image can be attained. Also, spatial color matching including gamut mapping that considers the color reproduction range of an output device can be attained.

Further features of the present invention will become apparent from the following description of exemplary embodiments with reference to the attached drawings.

DESCRIPTION OF THE EMBODIMENTS

Color processing according to an embodiment of the present invention will be described in detail hereinafter with reference to the drawings.

In general, a white point of ambient light under viewing conditions is different from that of a standard light source when performing colorimetry of color targets and color patches. For example, the standard light source used in colorimetry is D50 or D65, but ambient light during actual viewing of an image is not limited to D50 or D65 in a light booth and may be from an incandescent lamp or fluorescent lamp, or from a light obtained by mixing such light with sunlight. While in the following description, a light source of ambient light under viewing conditions is D50 or D65 for the sake of simplicity, in practice, a white point of ambient light and XYZ values under the ambient light are used.

First Embodiment

[Apparatus Arrangement]

Figure 1:
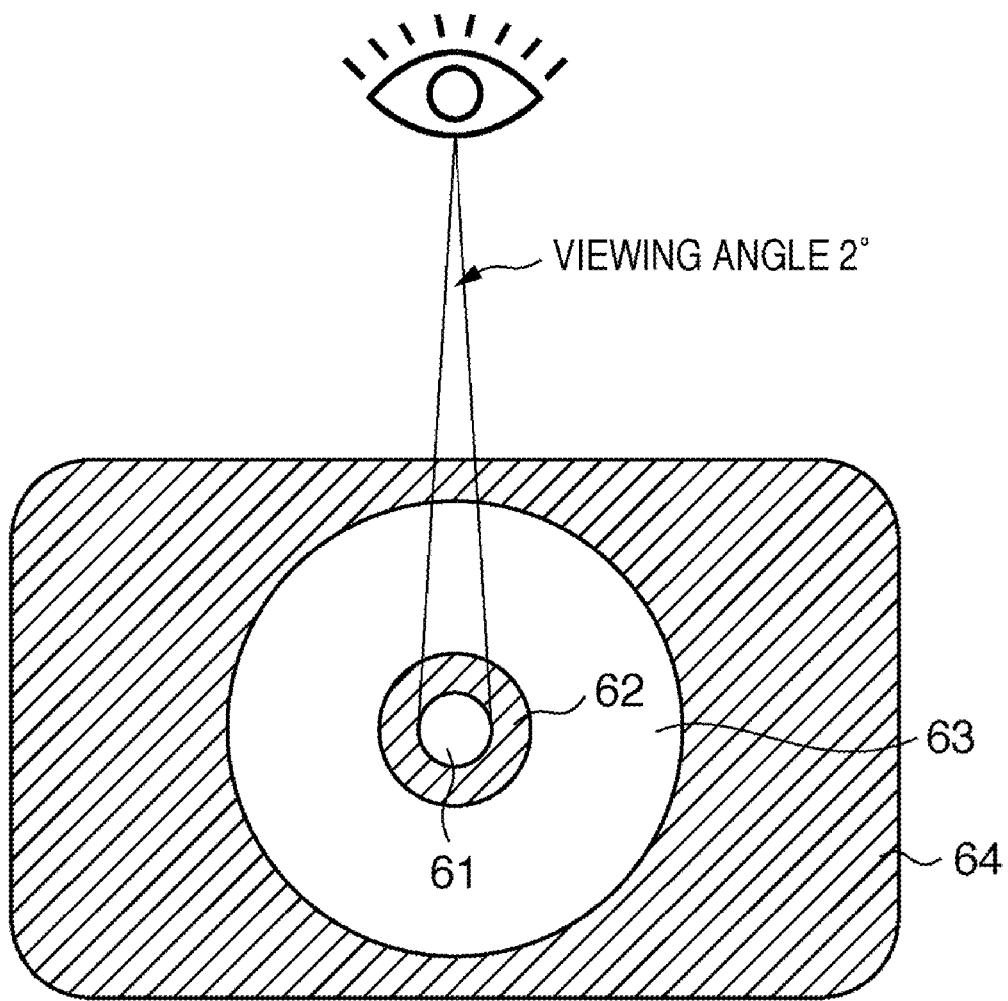
FIG. 1 is a view showing the definition of a field of view of a human in a color appearance model.
Figure 2:
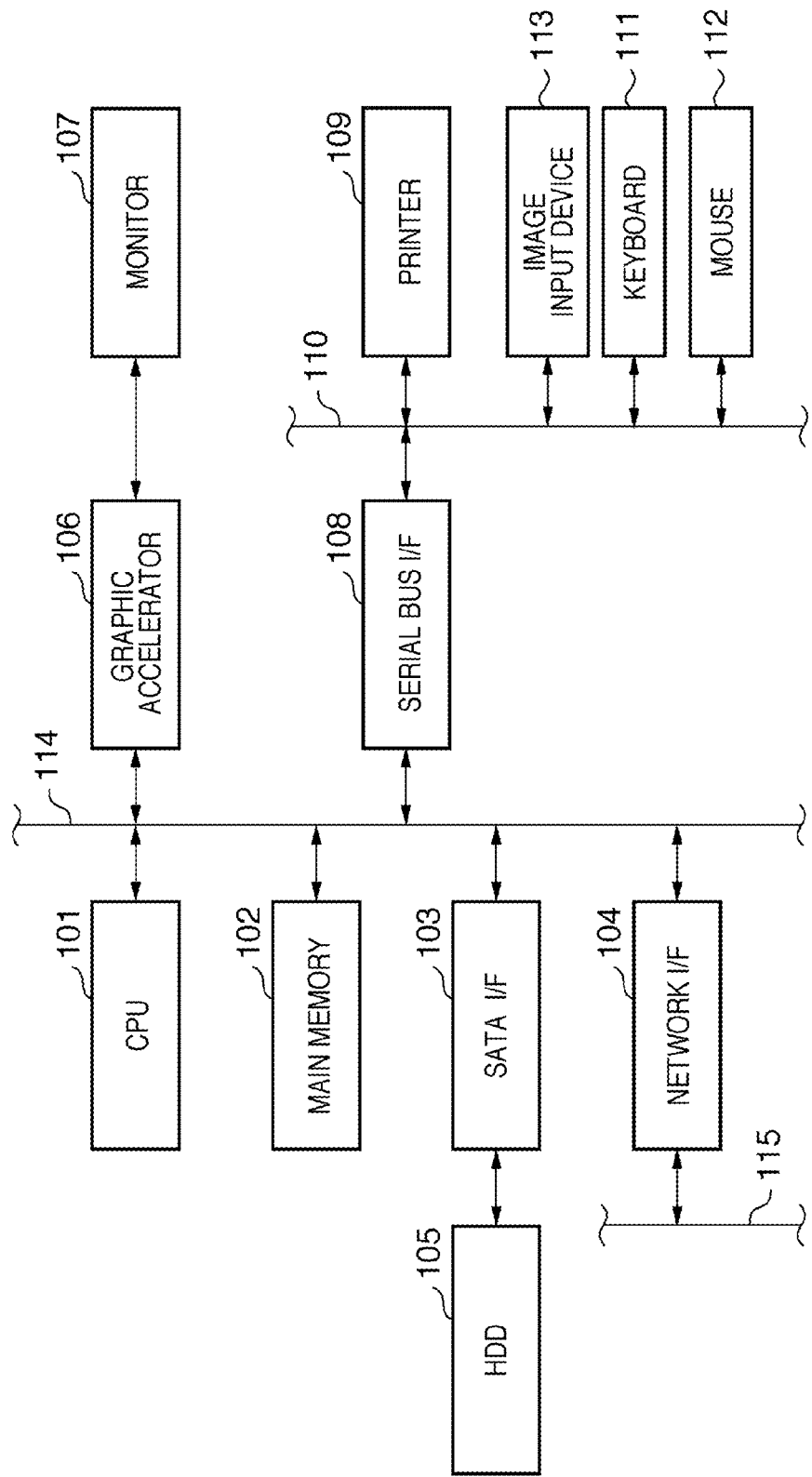
FIG. 2 is a block diagram showing the arrangement of a color processing apparatus according to an embodiment.

FIG. 2 is a block diagram showing the arrangement of a color processing apparatus according to an embodiment of the present invention.

A microprocessor (CPU) 101 executes an operating system (OS) and various programs stored in a read-only memory (ROM) of a main memory 102 and a hard disk drive (HDD) 105 using a random access memory (RAM) of the main memory 102 as a work memory. Then, the CPU 101 controls respective units via a system bus 114 such as a peripheral component interconnect (PCI) bus. Furthermore, the CPU 101 executes various programs including color matching processing to be described later.

The CPU 101 accesses the HDD 105 via the system bus 114 and a serial ATA interface (SATA I/F) 103. Also, the CPU 101 accesses a network 115 such as a local area network (LAN) via a network I/F 104.

The CPU 101 communicates with devices connected via a serial bus interface (I/F) 108 and a serial bus 110 such as USB (Universal Serial Bus) or IEEE1394. The CPU 101 acquires image data which is to undergo color matching processing from an image input device 113 including a card reader, and outputs image data to a printer 109 to print an image designated by, for example, the user. Note that the image data which is to undergo color matching processing may be read out from the HDD 105 or a server on the network 115.

The CPU 101 displays a user interface of processing to be described later and processing results on a monitor 107 via a graphic accelerator 106, and inputs user instructions via a keyboard 111 and mouse 112 connected to the serial bus 110.

[Arrangement of Color Matching Processing]

Figure 3:
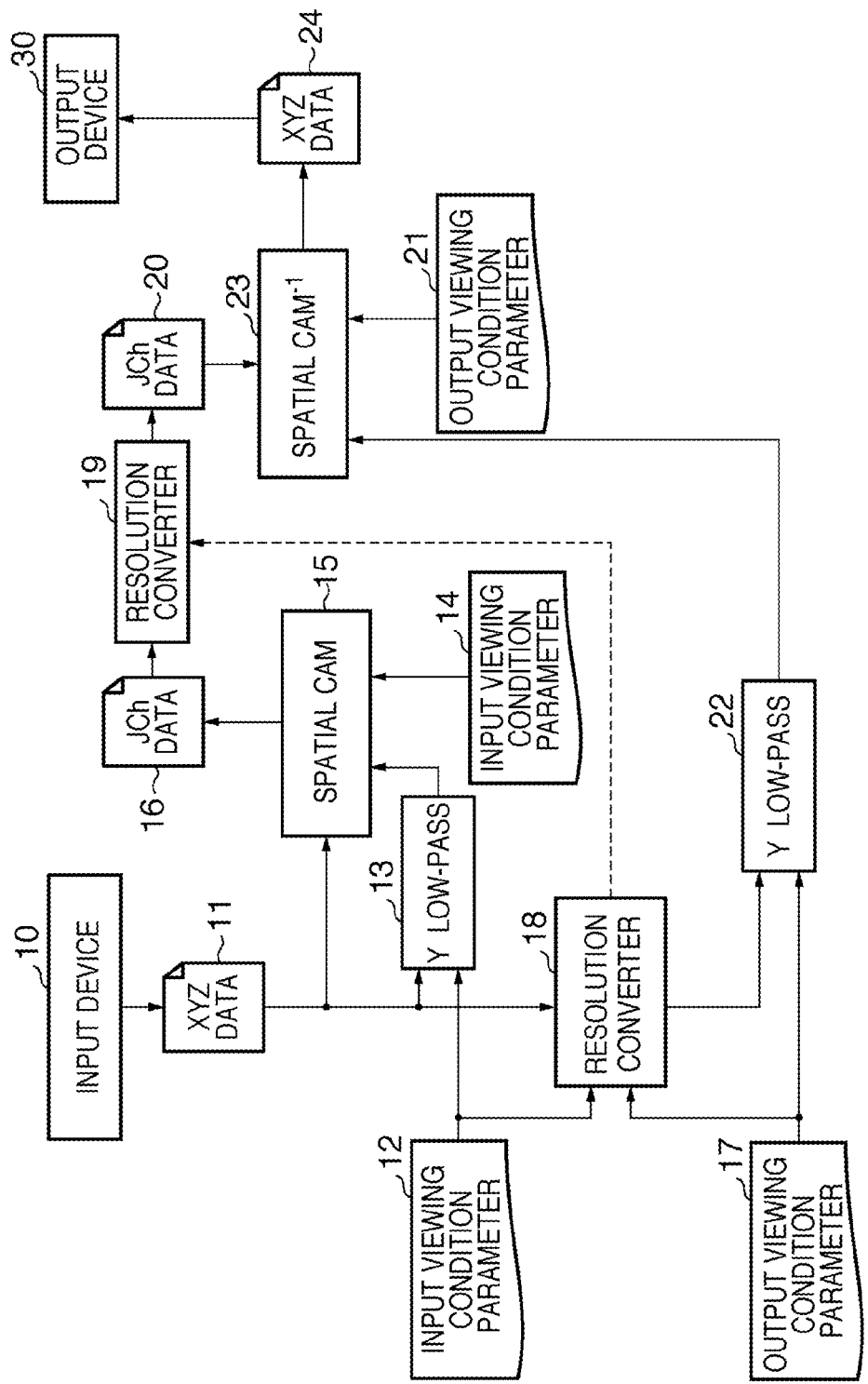
FIG. 3 is a block diagram for explaining color matching processing according to the first embodiment.

FIG. 3 is a block diagram for explaining color matching processing according to the first embodiment. The color matching processing of the first embodiment is an example of spatial color matching that considers the image resolution and viewing distance of the input side, and those of the output side.

XYZ data 11 are device-independent data with reference to the white point of ambient light of the input side. The XYZ data 11 are obtained by applying, to data depending on an input device 10, forward conversion of a device model created from, for example, an ICC (International Color Consortium) profile or WCS (Windows® Color System) profile of the input device 10.

On the other hand, XYZ data 24 are device-independent data with reference to the white point of ambient light of the output side. The XYZ data 24 can be converted into data depending on an output device 30 by applying inverse conversion of a device model created from, for example, an ICC profile or WCS profile of the output device 30.

Note that the input device 10 and output device 30 are not limited to device color spaces such as RGB and CMY (K), and may be arbitrary input and output devices such as a digital camera, digital video, scanner, monitor, projector, and printer.

Input viewing condition parameters 14 are those required to apply a forward conversion (spatial CAM) 15 of a spatial color appearance model to the XYZ data 11. Output viewing condition parameters 21 are those required to apply an inverse conversion (spatial CAM$^{-1}$) 23 of the spatial color appearance model to image data (JCh data) 20 of the output side on a color appearance space of a human. Upon application of, for example, CIECAM02 as a color appearance model, the input viewing condition parameters 14 and output viewing condition parameters 21 are as follows:

La: the absolute luminance [cd/m$^2$] (a value obtained by dividing Lw in the adapting field by Yb) of the adapting field, XYZ: the relative XYZ values of a color patch, XwYwZw: the relative XYZ values of the white point, Yb: the relative luminance of the background, and surround condition: Average Surround, Dim Surround, or Dark Surround.

Note that the color appearance model is not limited to CIECAM02, and other color appearance models such as CIECAM97s, Naya, Hunt, and RLAB models may also be used.

As the color appearance space of a human, a JCh (or JCH) space as a color appearance space relative to reference white of ambient light of the input side or a QMh (or QMH) space as an absolute color appearance space whose size changes depending on an illuminance level can be applied. One of these color spaces is selected according to whether the use application of color matching is relative or absolute color matching. In this case, an application example of the JCh space will be explained.

Referring back to FIG. 3, input viewing condition parameters 12 are those used to determine field sizes of an input image based on a viewing angle. Output viewing condition parameters 17 are those used to determine field sizes of an output image based on a viewing angle.

A low-pass filter (Y LOW-PASS) 13 is that determined based on the input viewing condition parameters 12, and applies low-pass filter processing to luminance image data of the XYZ data 11.

A resolution converter 18 converts the luminance image data of the XYZ data 11 into that of a resolution (resolution of the output side) of the XYZ data 24 based on resolutions indicated by the input viewing condition parameters 12 and output viewing condition parameters 17.

A low-pass filter (Y LOW-PASS) 22 is that determined from the output viewing condition parameters 17, and applies low-pass filter processing to the luminance image data converted to the resolution of the output side by the resolution converter 18.

The spatial CAM 15 applies the luminance image data output from the Y LOW-PASS 13 and the input viewing condition parameters 14 to the XYZ data 11 to convert the XYZ data 11 into image data (JCh data) 16 on the JCh space. A resolution converter 19 enlarges or reduces the JCh data 16 by resolution conversion equivalent to the resolution converter 18 to generate JCh data 20 that matches the resolution of the output side. The spatial CAM$^{-1}$ 23 applies the luminance image data output from the Y LOW-PASS 22 and the output viewing condition parameters 21 to the JCh data 20 to convert the JCh data 20 into the XYZ data 24.

Forward Converter of Spatial CAM

Figure 4:
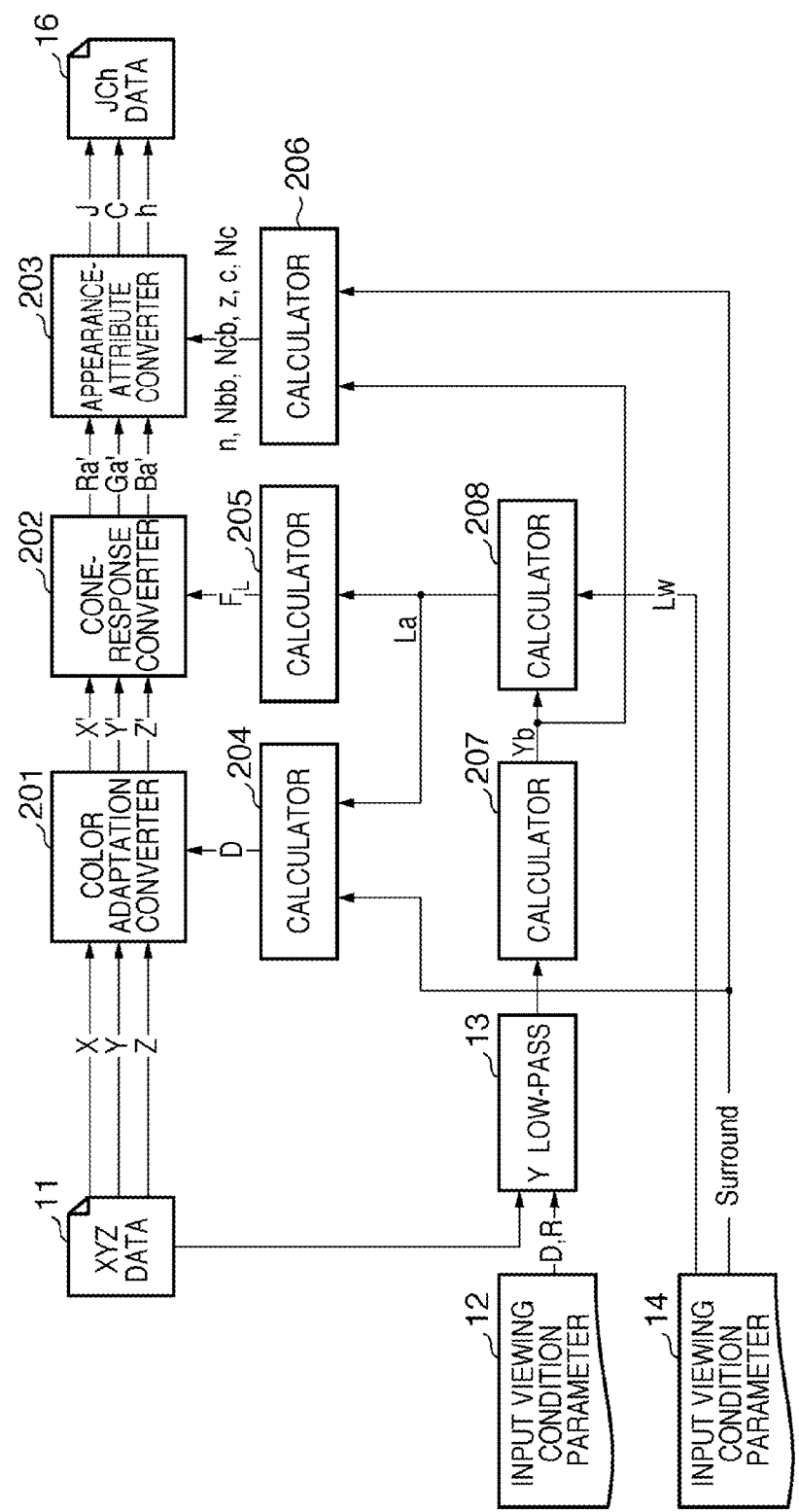
FIG. 4 is a block diagram showing the detailed arrangement of a spatial CAM.

FIG. 4 is a block diagram showing the detailed arrangement of the spatial CAM 15.

A calculator 207 calculates a relative luminance Yb of the background of the input side from a pixel value Y of the luminance image data (low-pass image of the input side) output from the Y LOW-PASS 13, which is located at the same position as a pixel of interest of the XYZ data 11. A calculator 208 calculates an absolute luminance La of an adapting field of the input side from the luminance Lw of the white point of the input viewing condition parameters 14 and the relative luminance Yb of the background of the input side by:

$$Yb = Y$$

$$La = Lw \cdot Yb \quad (1)$$

A calculator 204 calculates a degree D of color adaptation using a factor F of a degree of adaptation corresponding to the surround condition of the input viewing condition parameters 14 shown in Table 1 below by:

$$D = f1(La, \text{Surround}) = F\{1 - (1/3.6)^{(-La-42)/92}\} \quad (2)$$

TABLE 1

| Surround | F |
|---|---|
| Average | 1.0 |
| Dim | 0.9 |
| Dark | 0.8 |

A calculator 205 calculates a luminance level adaptation factor $F_L$ from the absolute luminance La of the adapting field of the input side by:

$$F_L = f2(La) = 0.2k^4(5La) + 0.1(1-k^4)^2(5La)^{1/3} \quad (3)$$

for k=1/(5La+1)

A calculator 206 calculates a background inducing coefficient n, induction factors Nbb and Ncb, and non-linearity z of a basic index from the relative luminance Yb of the background of the input side by:

$$n = f1(Yb) = Yb/Yw$$

$$Nbb = Ncb = f3(Yb) = 0.725(1/n)^{0.2}$$

$$z = f5(Yb) = 1.48 + \sqrt{n} \quad (4)$$

The calculator 206 determines an impact c of surrounding and chromatic induction factor Nc from the surround condition of the input viewing condition parameters 14, as shown in Table 2 below.

TABLE 2

| Surround | c | Nc |
|---|---|---|
| Average | 0.69 | 1.0 |
| Dim | 0.59 | 0.9 |
| Dark | 0.52 | 0.8 |

A color adaptation converter 201 executes forward conversion of CIECAM02 color adaptation conversion corresponding to a white balance for vision using the degree D of color adaptation.

A cone-response converter 202 executes forward conversion of CIECAM02 cone-response conversion corresponding to a receptor for vision using the luminance level adaptation factor $F_L$.

An appearance-attribute converter 203 executes forward conversion of CIECAM02 appearance-attribute conversion corresponding to the visual nerve using background inducing coefficient n, induction factors Nbb and Ncb, non-linearity z of the basic index, impact c of surrounding, and chromatic induction factor Nc. The appearance-attribute converter 203 receives a cone response (Ra', Ga', Ba') obtained from a pixel of interest (X, Y, Z) of the XYZ data 11 by the forward conversions of the color adaptation converter 201 and cone-response converter 202, and a cone response (Rw', Gw', Bw') obtained from a white point (Xw, Yw, Zw) of the input viewing condition parameters 14. Then, the appearance-attribute converter 203 outputs JCh data corresponding to the pixel of interest as the forward conversion result.

Note that the color adaptation converter 201 also uses the cone response (Rw', Gw', Bw') calculated from the white point (Xw, Yw, Zw) of the input viewing condition parameters 14. Also, the relative luminance Yb of the background of the input side, and the absolute luminance La of the adapting field of the input side, which are used as intermediate viewing condition parameters, are not fixed with respect to all pixels of the XYZ data 11, but they change according to the values of surround pixels.

Inverse Converter of Spatial CAM

Figure 5:
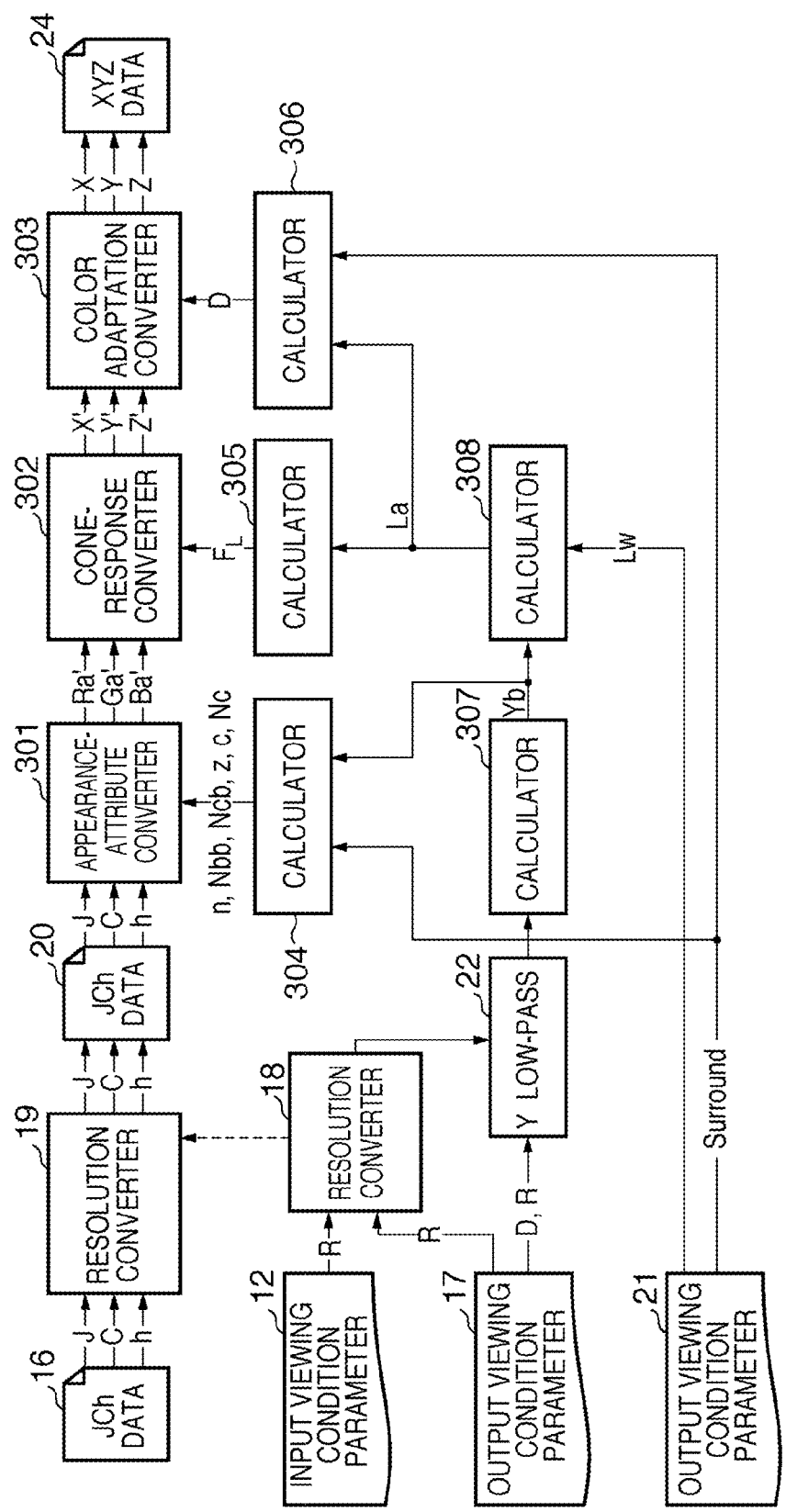
FIG. 5 is a block diagram showing the detailed arrangement of a spatial CAM$^{-1}$.

FIG. 5 is a block diagram showing the detailed arrangement of the spatial CAM$^{-1}$ 23.

A calculator 307 calculates a relative luminance Yb of the background of the output side from a pixel value of the luminance image data of the resolution of the output side (low-pass image of the output side) output from the Y LOW-PASS 22, which is located at the same position as a pixel of interest of the JCh data 20 output from the resolution converter 19. A calculator 308 calculates an absolute luminance La of an adapting field of the output side using equations (1) from the luminance Lw of the white point of the output viewing condition parameters 21 and the relative luminance Yb of the background of the output side.

A calculator 304 calculates a background inducing coefficient n, induction factors Nbb and Ncb, and non-linearity z of a basic index using equations (4) from the relative luminance Yb of the background of the output side. Furthermore, the calculator 304 determines an impact c of surrounding and chromatic induction factor Nc from the surround condition of the output viewing condition parameters 21 using Table 2 above.

A calculator 305 calculates a luminance level adaptation factor $F_L$ using equation (3) from the absolute luminance La of the adapting field of the output side.

A calculator 306 calculates, by equation (2), a degree D of color adaptation using a factor F of a degree of adaptation corresponding to the surround condition of the output viewing condition parameters 21 shown in Table 1 above.

An appearance-attribute converter 301 executes inverse conversion of CIECAM02 appearance-attribute conversion corresponding to the visual nerve using background inducing coefficient n, induction factors Nbb and Ncb, non-linearity z of the basic index, impact c of surrounding, and chromatic induction factor Nc.

A cone-response converter 302 executes inverse conversion of CIECAM02 cone-response conversion corresponding to a receptor for vision using the luminance level adaptation factor $F_L$.

A color adaptation converter 303 executes inverse conversion of CIECAM02 color adaptation conversion corresponding to a white balance for vision using the degree D of color adaptation.

That is, the resolution converter 19 converts the JCh data 16 of the input side obtained by the forward conversion of the spatial CAM 15 into the JCh data 20 of the output side. The color adaptation converter 303 receives a cone inverse response (X', Y', Z') obtained from a pixel of interest (J, C, h) of the JCh data 20 by the inverse conversions of the appearance-attribute converter 301 and cone-response converter 302, and a cone inverse response (Xw', Yw', Zw') obtained from a white point (Xw, Yw, Zw) of the output viewing condition parameters 21. Then, the color adaptation converter 303 outputs the XYZ data 24 as output device-independent data for the pixel of interest as the inverse conversion result.

Note that the color adaptation converter 303 also uses the cone inverse response (Xw', Yw', Zw') calculated from the white point (Xw, Yw, Zw) of the output viewing condition parameters 21. Also, the relative luminance Yb of the background of the output side, and the absolute luminance La of the adapting field of the output side, which are used as intermediate viewing condition parameters, are not fixed with respect to all pixels of the JCh data 20 of the output side, but change according to the values of surround pixels.

[Sequence of Processing]
Forward Conversion

Figure 6:
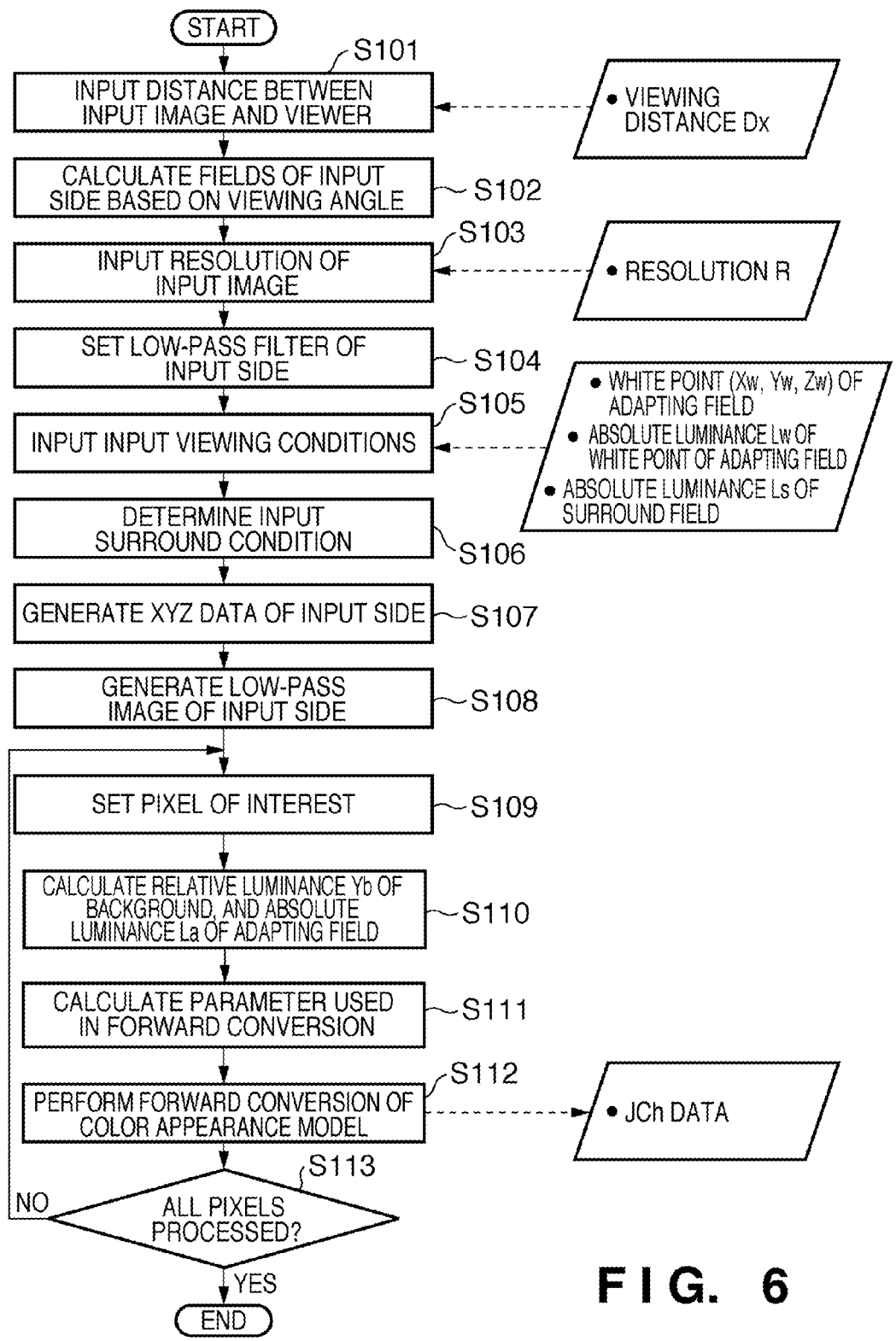
FIG. 6 is a flowchart for explaining the color matching processing of this embodiment.

FIG. 6 is a flowchart explaining color matching processing of this embodiment; the CPU 101 executes this processing. Note that FIG. 6 shows the processing for converting input image data into JCh data of the same resolution.

Figure 8:
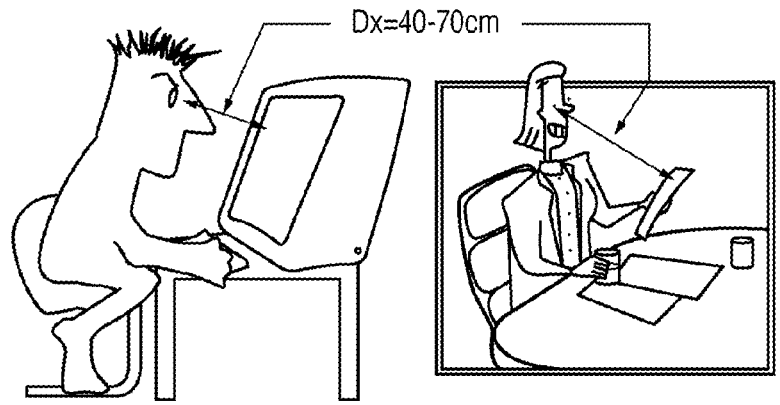
FIG. 8 is a view for explaining the viewing distance.

The CPU 101 inputs a distance Dx between an input image and viewer (S101). For example, the distance between a monitor screen or printed material and the viewer ranges from 0.4 to 0.7 m, as shown in FIG. 8, and the user can input an arbitrary distance Dx. In this case, Dx=0.5 m is used. As will be described later, as the distance between the image and viewer, different values can be set on the input and output sides.

Figure 9:
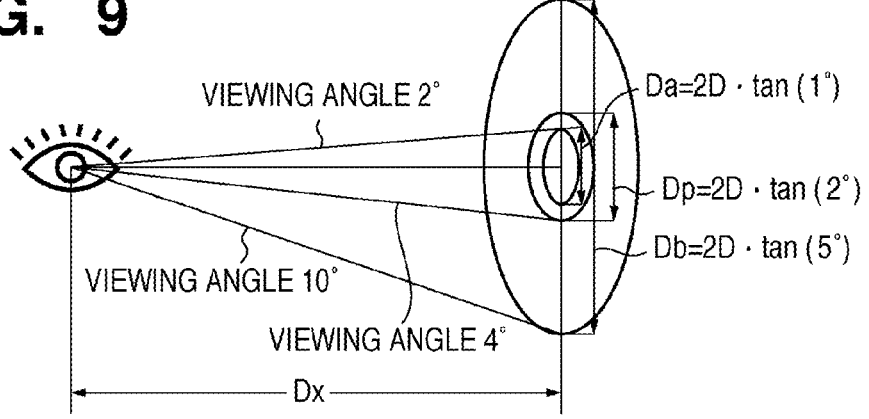
FIG. 9 is a view for explaining calculations of the diameters of a stimulus, proximal field, and background.

The CPU 101 then calculates fields of the input side based on the viewing angle (S102). That is, the CPU 101 calculates the diameters of the stimulus 61, proximal field 62, and background 63 based on the distance Dx between the input image and viewer. As shown in FIG. 9, the line of sight is assumed to intersect the surface of an image nearly perpendicularly. Therefore, the CPU 101 calculates the diameters of the stimulus 61, proximal field 62, and background 63 by:

$$Da = 2 \times Dx \times \tan(1°) [m]$$

$$Dp = 2 \times Dx \times \tan(2°) [m]$$

$$Db = 2 \times Dx \times \tan(5°) [m] \quad (5)$$

where Da is the diameter of the stimulus 61 within the viewing angle of 2°,

Dp is the diameter of the proximal field 62 within the viewing angle of 4°,

Db is the diameter of the background 63 within the viewing angle of 10°, and when Dx=0.5 [m], Da=17 [mm], Dp=35 [mm], and Db=87 [mm].

The CPU 101 inputs a resolution R [ppi] of the input image (S103). If the input image is, for example, an image displayed on the monitor (to be referred to as a monitor image hereinafter), R=72 ppi, if the input image is a print image, the resolution R=400 ppi of a printer, and so forth. In practice, the resolution to be input depends on that designated by an application or device driver, or on a zoom ratio.

The CPU 101 calculates the numbers of pixels of the image corresponding to the diameters of the stimulus 61, proximal field 62, and background 63 by:

$$Dap = Da \times R/0.0254 [pixels]$$

$$Dpp = Dp \times R/0.0254 [pixels]$$

$$Dbp = Db \times R/0.0254 [pixels] \quad (6)$$

where Dap is the number of pixels of the diameter of the stimulus 61,

Dpp is the number of pixels of the diameter of the proximal field 62, and

Dbp is the number of pixels of the diameter of the background 63.

The CPU 101 then sets the low-pass filter (Y LOW-PASS) 13 of the input side (S104). That is, the CPU 101 calculates the numbers of pixels associated with the pass range of the Y LOW-PASS 13 of the input side.

When Dx=0.5 m and R=72 ppi, Dap=48.2 pixels, Dpp=99.0 pixels, and Dbp=246.6 pixels. In this case, for the sake of simplicity, a function f(x, y) of the Y LOW-PASS 13 of the input side is dynamically determined so that the number Dbp of pixels of the diameter of the background 63 equals 2σ in:

$$f(x,y) = 1/(2\pi\sigma^2) \cdot \exp[-\{(x-\mu)^2+(y-\mu)^2\}/\sigma^2] \quad (7)$$

where μ corresponds to the center value of the filter, and μ=0.

Note that 2σ=Dbp is used, but σ changes depending on a distance D and resolution R, and different values can be set on the input and output sides.

The CPU 101 inputs input viewing conditions (S105). As the input viewing conditions, instruction values of a measuring device (not shown) connected to the serial bus 110 may be input, or the user may manually input the conditions.

The input viewing conditions to be input include the XYZ values (Xw, Yw, Zw) of the white point of the adapting field, the absolute luminance Lw [cd/m²] of the white point of the adapting field, and the absolute luminance Ls [cd/m²] of the surround field 64. The white point of the adapting field is a monitor white point in the case of a monitor image, or is calculated based on the XYZ values of white of a surface of a printed material and (an illuminance [lux] on the printed material/π) in the case of the printed material.

On the other hand, strictly speaking, the absolute luminance Ls of the surround field 64 is that of an outer field of the viewing angle of 10° with respect to a pixel of interest. However, for the sake of simplicity, the absolute luminance Ls of the surround field 64 is that around a monitor in the case of a monitor image, or is that around a printed material in the case of the printed material. Note that different values can be set as the absolute luminance according to the input and output viewing conditions.

Next, the CPU 101 determines the input surround condition (S106). For example, the CPU 101 determines the surround condition as follows.

if (0.2≦Ls/Lw) Average Surround;
if (0.06<Ls/Lw<0.2) Dim Surround;
if (Ls/Lw≦0.06) Dark Surround;

Note that when Ls and Lw assume different values on the input and output sides, the surround conditions are independently determined on the input and output sides. When the surround condition is given, the user can manually and directly designate the surround condition.

The CPU 101 inputs an input image, and generates the XYZ data 11 of the input side by forward conversion of a device model created based on the ICC profile or WCS profile of the input device 10 (S107). Then, the CPU 101 applies filter processing using the Y LOW-PASS 13 to Y components (luminance components) of the XYZ data 11 to generate a low-pass image of the input side (S108).

The CPU 101 then sets a pixel of interest of the XYZ data 11 (S109), and applies the following processes to the pixel of interest in, for example, a raster-scan order.

The CPU 101 controls the calculators 207 and 208 to acquire a luminance value Y of the pixel of interest in the low-pass image of the input side, and to calculate the relative luminance Yb of the background 63 and the absolute luminance La of the adapting field with respect to the pixel of interest using equations (1) (S110). Then, the CPU 101 controls the calculators 204, 205, and 206 to calculate parameters used in forward conversion (S111), and controls the spatial CAM 15 to forward convert the XYZ values of the pixel of interest of the XYZ data 11 into JCh values (S112).

The CPU 101 determines if the processes in steps S110 to S112 have been applied to all pixels of the XYZ data 11 (S113). If pixels to be processed still remain, the process returns to step S109. If the processing for all the pixels is complete, the CPU 101 ends the processing shown in FIG. 6. At the time of completion of the processing, the JCh data 16 are completed.

Note that the viewing distance and resolution of the input side, and input viewing conditions may be acquired from a profile of the input side.

Inverse Conversion

Figure 7:
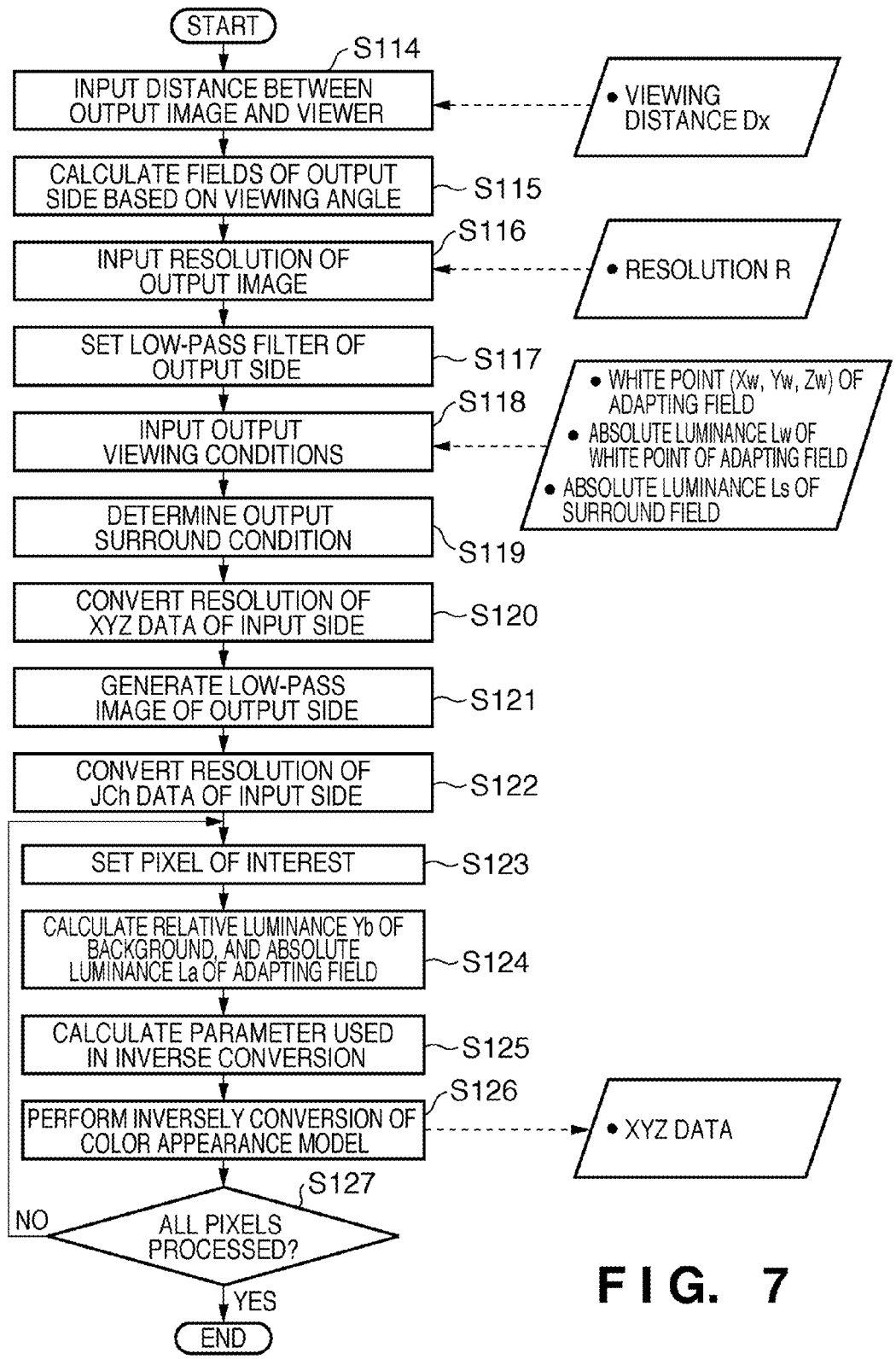
FIG. 7 is a flowchart for explaining inverse conversion of the color matching processing of this embodiment.

FIG. 7 is a flowchart for explaining inverse conversion of the color matching processing of this embodiment, and the CPU 101 executes this processing. Note that FIG. 7 shows the processing for converting JCh data having the same resolution as that of the input device into output image data having a different resolution.

As in the processes in steps S101 to S106, the CPU 101 inputs a distance Dx between an output image and the viewer (S114), calculates fields of the output side based on the viewing angle (S115), and inputs a resolution R [ppi] of the output image (S116). The CPU 101 then sets the low-pass filter (Y LOW-PASS) 22 of the output side (S117), inputs output viewing conditions (S118), and determines the output surround condition (S119). Note that different values can be set for respective parameters of the distance Dx, resolution R, and adapting field of the output side on the input and output sides.

The CPU 101 controls the resolution converter 18 to convert the resolution of the XYZ data 11 into a resolution of the output side (S120). The resolution converter 18 changes a resolution conversion method by comparing the Y value of a pixel of interest of the XYZ data 11, and that of a pixel of interest of the low-pass image of the input side. For example, when the Y value of the XYZ data 11 is equal to that of the low-pass image of the input side, the resolution converter 18 uses a nearest neighbor method; when these Y values are different, it uses a bicubic method, thereby speeding up the processing and improving the image quality of an image after resolution conversion. The combination of the resolution conversion methods is not limited to that of the nearest neighbor method and bicubic method. For example, other resolution conversion methods such as a bilinear method may be combined, or a single resolution conversion method may be used without comparing the Y values.

The CPU 101 then applies filter processing using the Y LOW-PASS 22 to Y components (luminance components) of an image output from the resolution converter 18 to generate a low-pass image of the output side (S121). The CPU 101 controls the resolution converter 19 to convert the resolution of the JCh data 16 into a resolution of the output side using the same resolution conversion method as that used by the resolution converter 18, thus generating the JCh data 20 (S122).

Next, the CPU 101 sets a pixel of interest of the JCh data 20 (S123), and applies the following processes to the pixel of interest in, for example, a raster-scan order.

The CPU 101 controls the calculators 307 and 308 to acquire a luminance value Y of the pixel of interest in the low-pass image of the output side, and to calculate the relative luminance Yb of the background 63 and the absolute luminance La of the adapting field with respect to the pixel of interest using equations (1) (S124). The CPU 101 then controls the calculators 304, 305, and 306 to calculate parameters used in inverse conversion (S125). The CPU 101 controls the spatial CAM$^{-1}$ 23 to inversely convert the JCh values of the pixel of interest of the JCh data 20 into XYZ values (S126).

The CPU 101 determines if the processes in steps S124 to S126 have been applied to all pixels of the JCh data 20 (S127). If pixels to be processed still remain, the process returns to step S123. If the processes for all the pixels are complete, the CPU 101 ends the processing shown in FIG. 7. At the time of completion of the processing, the XYZ data 24 are completed.

In this way, spatial color matching that considers the image resolution and viewing distance of the input side and those of the output side can be realized.

In the above description, spatial color matching between two devices (e.g., devices of the input and output sides) has been explained for the sake of simplicity. However, a combination of devices to which the aforementioned spatial color matching is applicable is not limited to two devices, and three or more devices such as a device of the input side, a target device, and a device of the output side may be combined.

[Input of Viewing Distance]

The viewing distance Dx in steps S101 and S114 can be automatically input using a ranging sensor.

Figure 10:
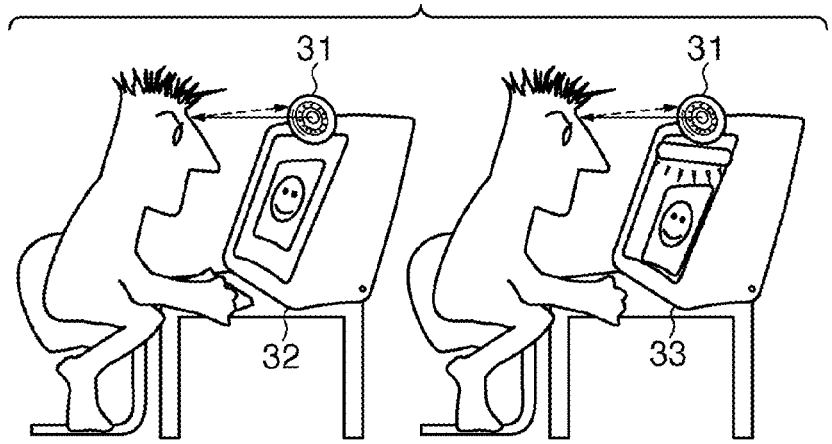
FIG. 10 is a view showing automatic input of the viewing distance using a ranging sensor.

As shown in FIG. 10, a ranging sensor 31 is placed on the upper portion of a monitor 32 or viewing box 33. Then, for example, a time period required from when the ranging sensor 31 emits infrared rays until the infrared rays reflected by the viewer reaches the ranging sensor 31 is measured, and is converted into the viewing distance Dx.

Figure 11:
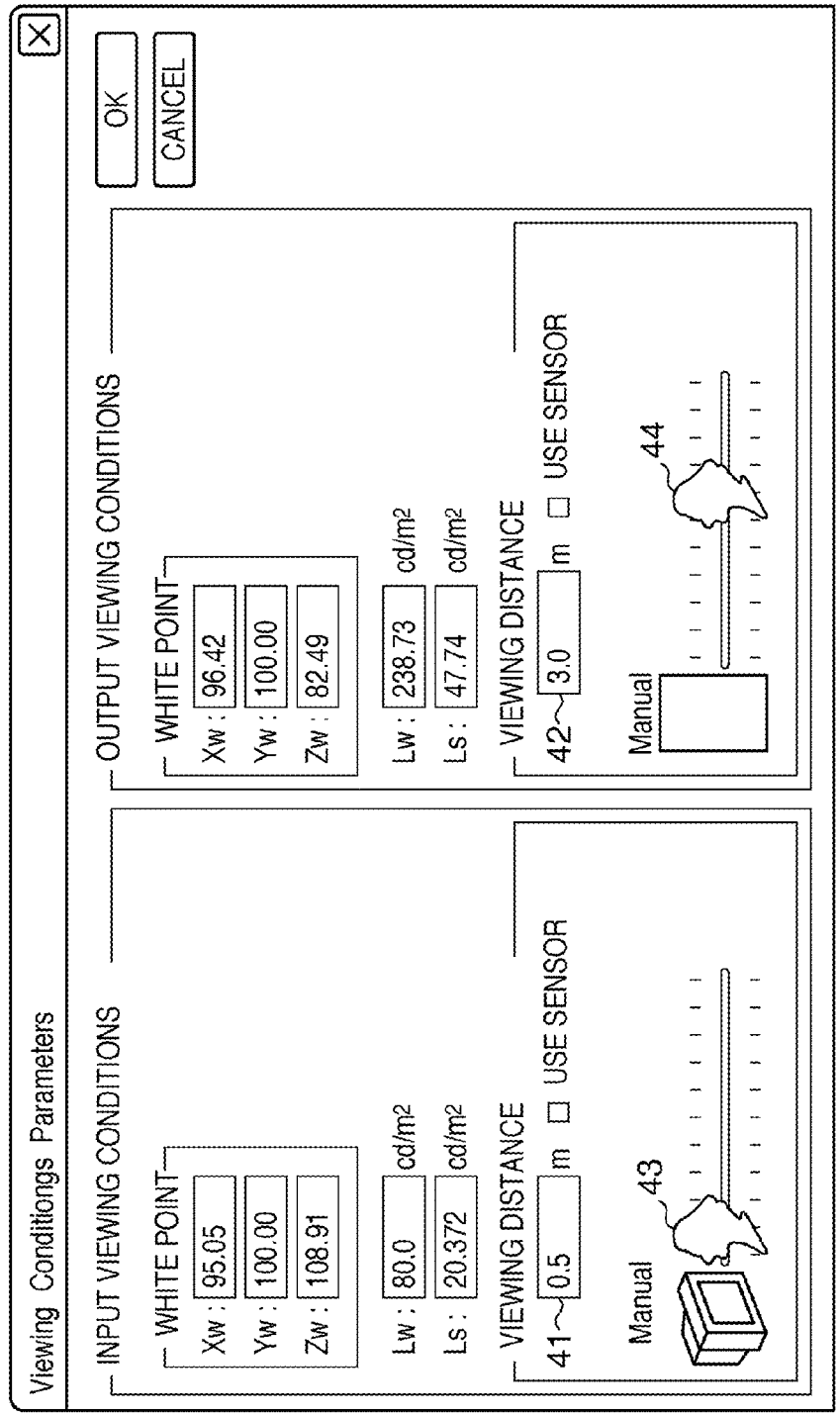
FIG. 11 is a view showing an example of a user interface used to input viewing conditions.

FIG. 11 is a view showing an example of a user interface used to input viewing conditions, and this user interface is displayed on the monitor 107.

The user checks "use sensor" check boxes to indicate when he or she wishes to use the ranging sensor 31. When the user does not wish to use the ranging sensor 31, he or she must input the viewing distances Dx by directly entering the numerical values of the viewing distances Dx in input boxes 41 and 42 or by using the slider controls 43 and 44.

The user interface does not include any resolution input box. However, the resolution is automatically determined based on additional information of an input image, the resolution designated by an application or device driver, on a zoom ratio, or the like.

Second Embodiment

Color processing according to the second embodiment of the present invention will be described below. Note that the same reference numerals in the second embodiment denote the same components as in the first embodiment, and a detailed description thereof will not be given.

Figure 12:
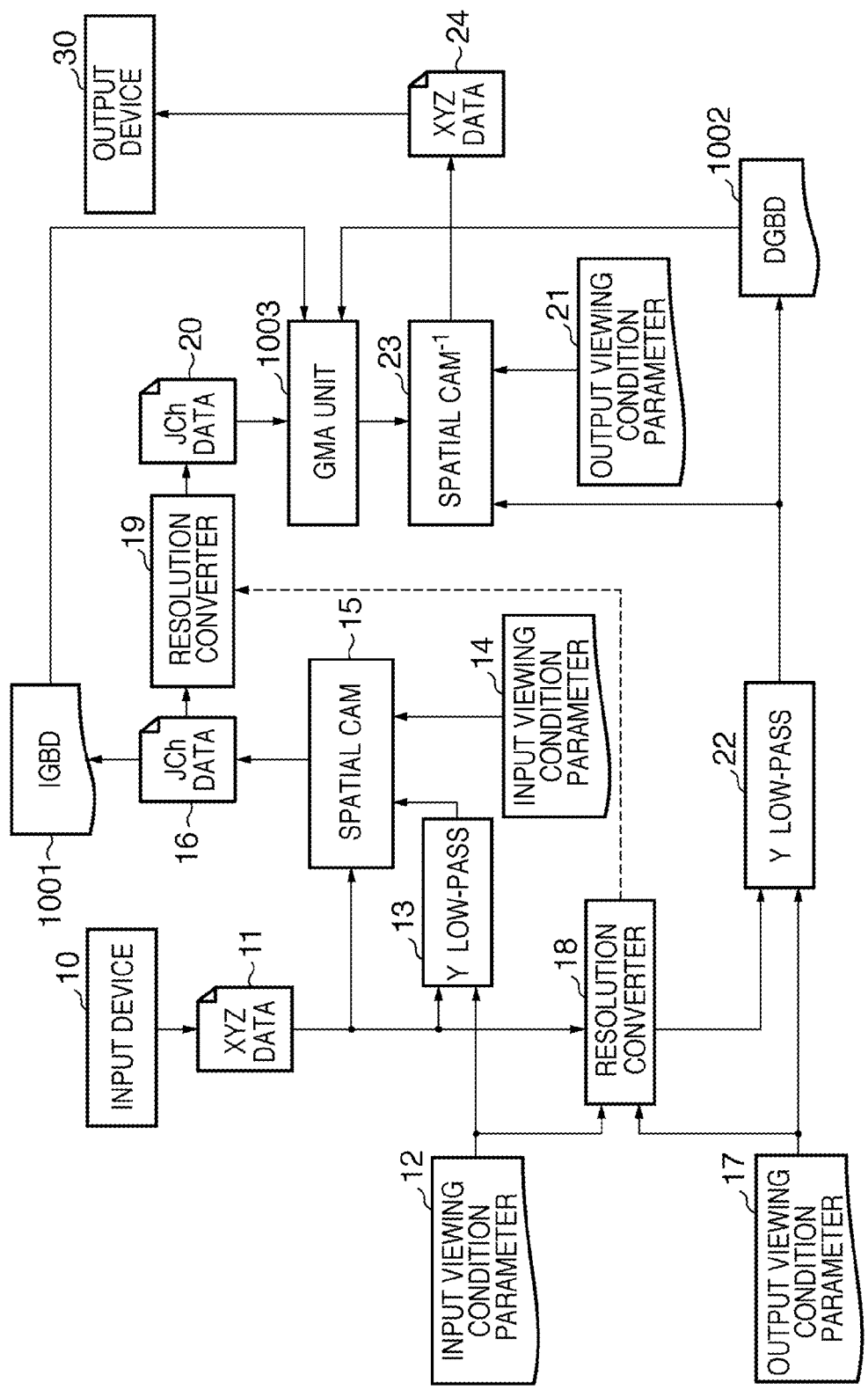
FIG. 12 is a block diagram for explaining color matching processing according to the second embodiment.

FIG. 12 is a block diagram for explaining color matching processing according to the second embodiment. The color matching processing according to the second embodiment is an example of spatial color matching including gamut mapping that takes the color reproduction ranges of the input and output sides into consideration.

An IGBD (Image Specific Gamut Boundary Description) 1001 is information generated from an input image that indicates the color reproduction range of the input image. A DGBD (Device Gamut Boundary Description) 1002 is information generated from information of an output device 30, that indicates the color reproduction range of the output side. A GMA (Gamut Mapping Algorithm) unit 1003 executes gamut mapping that considers the IGBD 1001 and DGBD 1002.

The IGBD 1001 is calculated by creating, for example, a three-dimensional convex hull on a JCh space with respect to JCh values of all pixels of JCh data 16 of the input side. Since the JCh data 16 of the input side have already been processed considering parameters which are determined for respective pixels depending on the low-pass image of the input side, the color reproduction range of an input image can be uniquely determined as long as the input image and input viewing conditions are determined.

The DGBD 1002 is generated as follows. The output device 30 outputs a plurality of color patches which evenly divide its device space (RGB, CMYK, or the like), and the output color patches are calorimetrically measured to acquire XYZ values. Based on parameters (Yb, La, and the like) of the output side, which are determined based on the luminance value of the low-pass image of the output side with respect to a pixel of interest, and the output viewing conditions, XYZ values are converted into JCh values by CIECAM02 forward conversion. Then, for example, a three-dimensional convex hull is created in the JCh space for as many of the JCh values as the number of color patches, thus generating the DGBD 1002.

Note that color patches are not limited to those which are evenly distributed on the device space, but color patches which unevenly divide the device space, or those which represent the boundaries of the device space may be used. Note that generation of the color reproduction range of the input image and that of the output device 30 is not limited to that of three-dimensional convex hulls, but a method that considers a concave part may be used.

Figure 13:
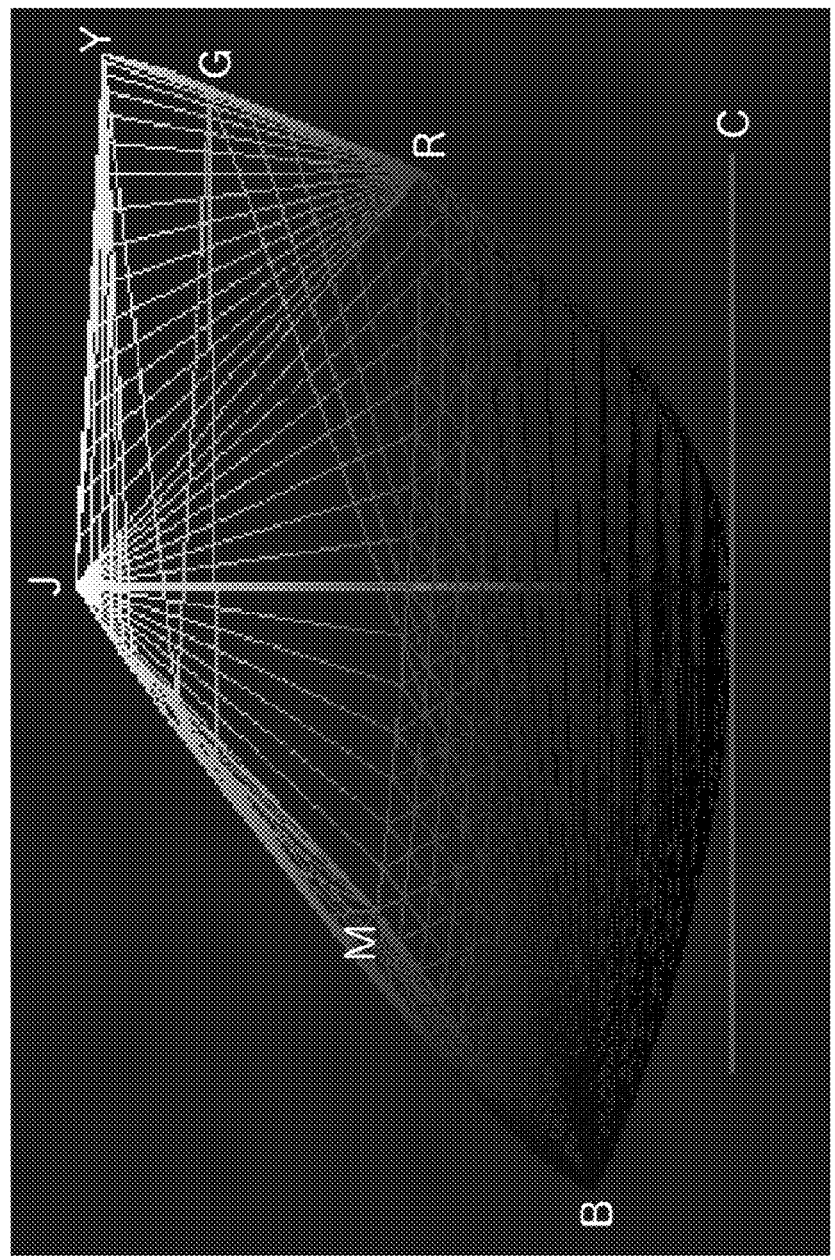
FIG. 13 is a view showing an sRGB color reproduction range by a three-dimensional convex hull on a JCh space.
Figure 14:
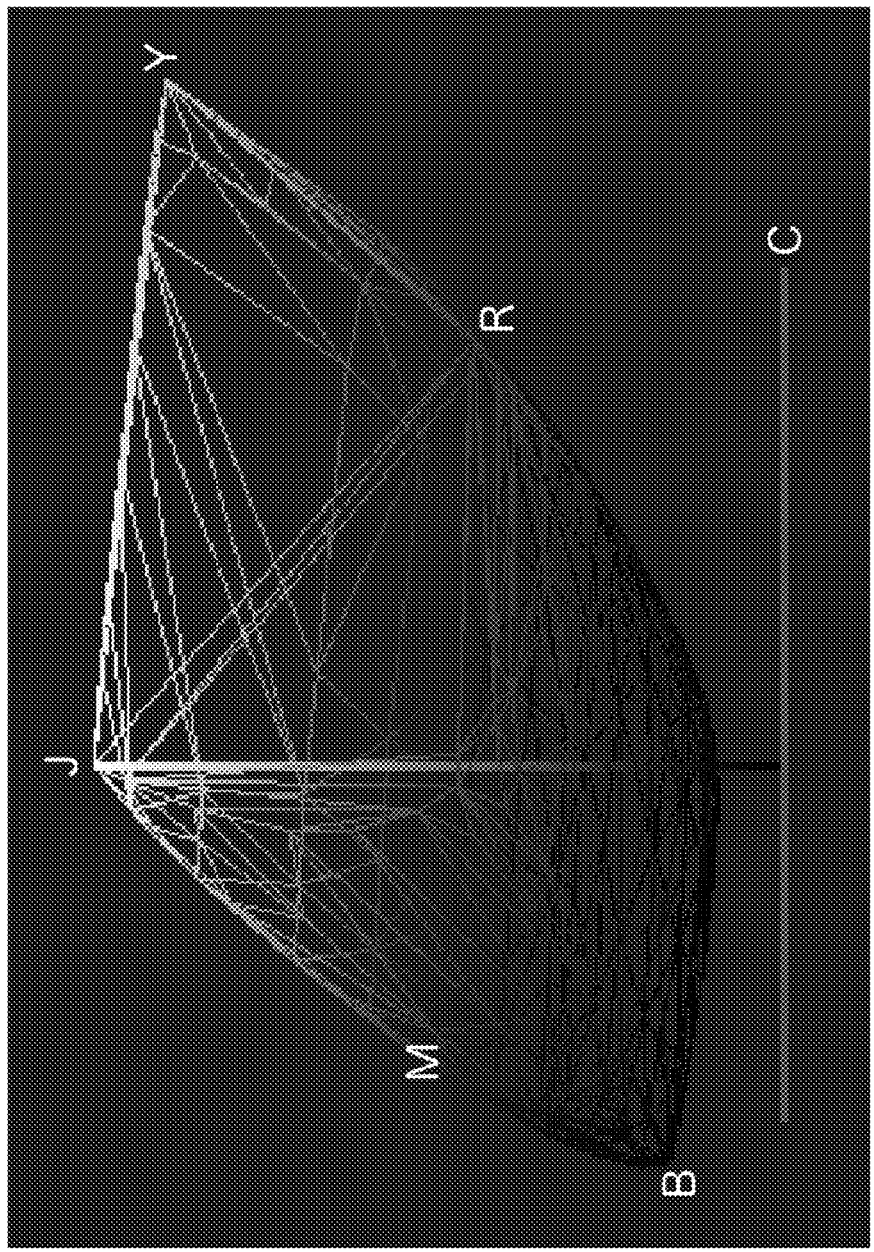
FIG. 14 is a view showing a printer color reproduction range by a three-dimensional convex hull on the JCh space.

The XYZ values as many as the number of color patches are uniquely determined with respect to the output device 30. However, since as many JCh values as the number of color patches are determined with respect to each pixel of interest, the DGBD 1002 has to be calculated for each pixel. That is, respective pixels have different color reproduction ranges of the device on the JCh space. FIG. 13 is a view showing an sRGB color reproduction range using a three-dimensional convex hull on the JCh space, and FIG. 14 is a view showing a printer color reproduction range using a three-dimensional convex hull on the JCh space.

The GMA unit 1003 maps JCh values of a pixel of interest of JCh data 20, which is converted to the resolution of the output side, into those of the color reproduction range of the output device 30 with reference to the IGBD 1001 and the color reproduction range of the DGBD 1002 corresponding to the pixel of interest. Note that a plurality of gamut mapping methods such as "perceptual", "calorimetric", and "saturation" are prepared, and the user can select the gamut mapping method according to the type of an input image and the use application of an output image.

Figure 15A:
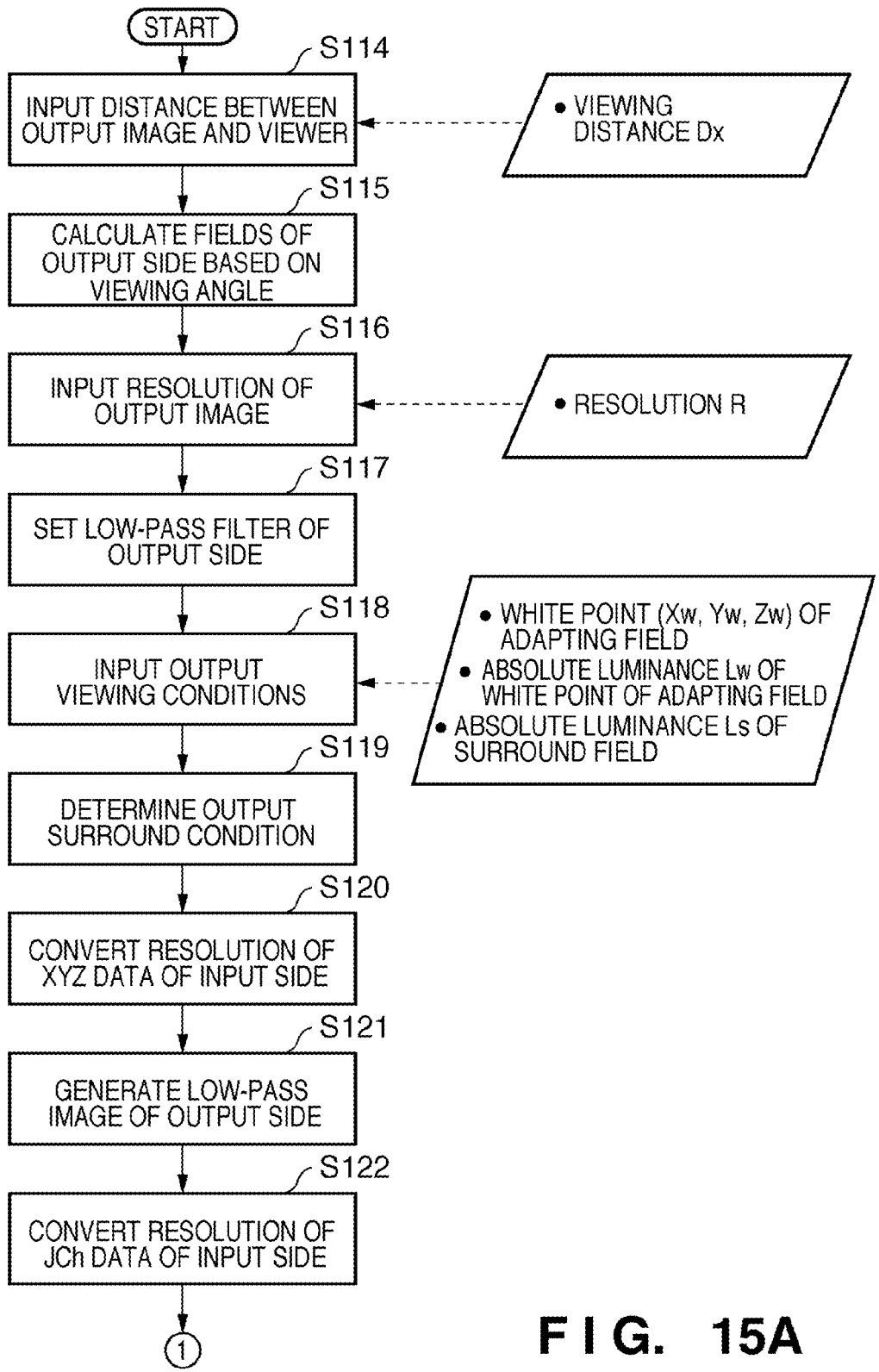
FIGS. 15A and 15B are flowcharts for explaining inverse conversion of the color matching processing according to the second embodiment.
Figure 15B:
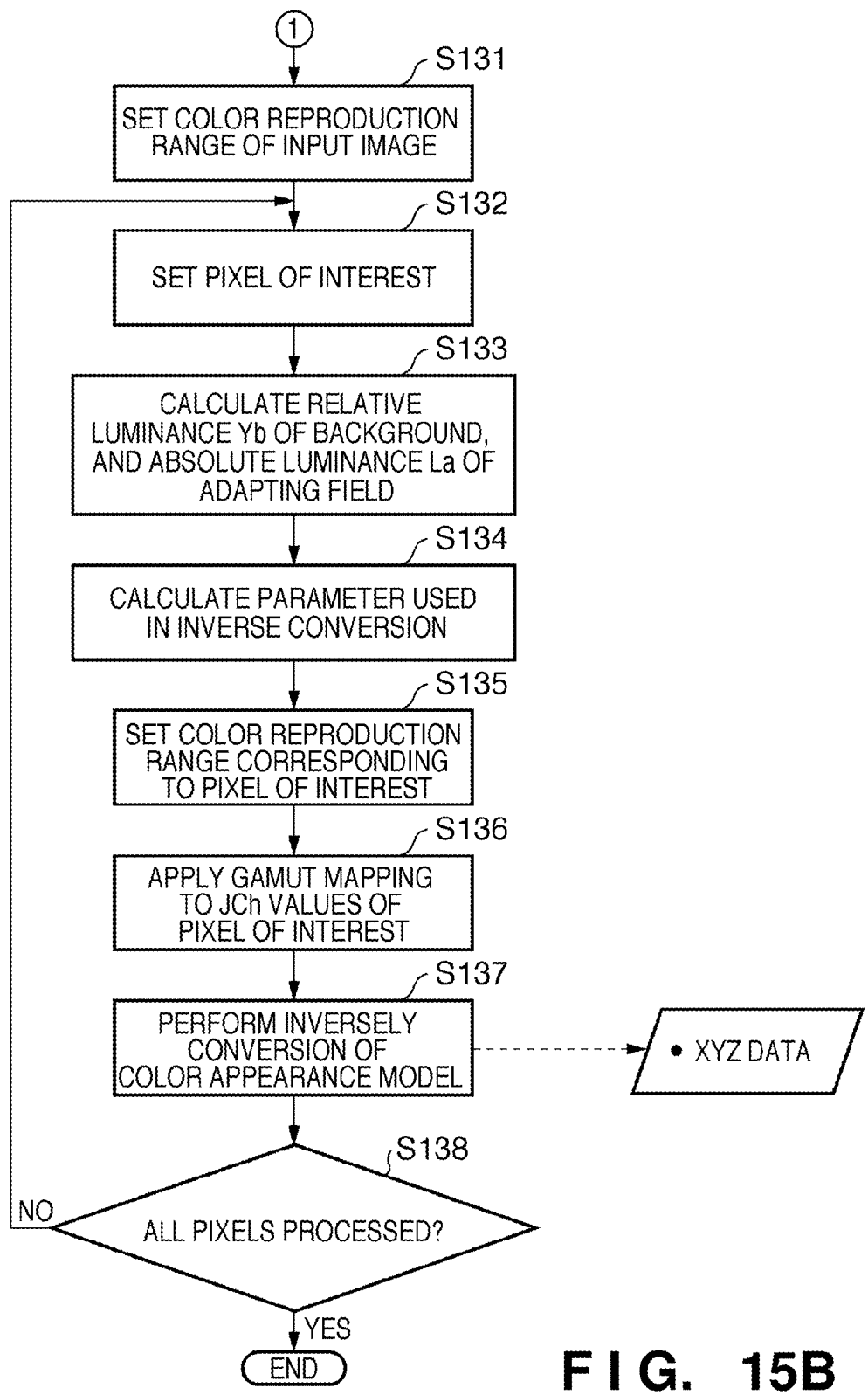

FIGS. 15A and 15B are flowcharts for explaining inverse conversion of the color matching processing of the second embodiment, and a CPU 101 executes this processing. Note that the forward conversion of the second embodiment is the same as the processing of the first embodiment shown in FIG. 6.

The processes from input of the distance Dx (S114) until generation of the JCh data 20 of the resolution of the output side (S122) are the same as those of the first embodiment shown in FIG. 7.

The CPU 101 acquires the color reproduction range of an input image from the IGBD 1001 and sets it in the GMA unit 1003 (S131). The CPU 101 sets a pixel of interest of the JCh data 20 (S132), and applies the following processes to the pixel of interest in, for example, a raster-scan order.

The CPU 101 controls calculators 307 and 308 to acquire a luminance value Y of the pixel of interest in the low-pass image of the output side, and to calculate the relative luminance Yb of a background 63 and the absolute luminance La of the adapting field with respect to the pixel of interest using equations (1) (S133). The CPU 101 then controls calculators 304, 305, and 306 to calculate parameters used in inverse conversion (S134).

The CPU 101 acquires a color reproduction range corresponding to the pixel of interest from the DGBD 1002, and sets it in the GMA unit 1003 (S135). The CPU 101 controls the GMA unit 1003 to apply gamut mapping to JCh values of the pixel of interest so as to map them on JCh values in the color reproduction range of the output device 30 (S136). After that, the CPU 101 controls a spatial $CAM^{-1}$ 23 to inversely convert the JCh values of the pixel of interest after the gamut mapping into XYZ values (S137).

The CPU 101 determines if the processes in steps S133 to S137 have been applied to all pixels of the JCh data 20 (S138). If pixels to be processed still remain, the process returns to step S132. If the processing for all the pixels is complete, the CPU 101 ends the processing shown in FIGS. 15A and 15B. At the time of completion of the processing, XYZ data 24 are completed.

In this way, spatial color matching that considers the color reproduction ranges of the input and output sides in addition to the image resolution and viewing distance of the input side and those of the output side can be implemented.

In the example of the above description, the color reproduction range of an input image is used as that of the input side. Alternatively, the color reproduction range of the input device 10 may be used as that of the input side. In this case, respective pixels have different color reproduction ranges of the input device 10 on the JCh space like the color reproduction range of the output device 30. Therefore, a color reproduction range of the input device 10 has to be calculated for each pixel to set the color reproduction range of the input side in the GMA unit 1003.

In the example of the above description, the resolution conversion of the resolution converter 19 is executed as pre-processing of the gamut mapping of the GMA unit 1003. However, the resolution conversion is not limited to pre-processing of the gamut mapping. For example, the resolution conversion may be executed in the gamut mapping processing or as post-processing of the gamut mapping.

According to the embodiment, since field sizes of images of the input and output sides are defined in the images based on the viewing angle, spatial color matching can be implemented under viewing conditions including different resolutions and viewing distances of the input and output sides.

Since the resolution conversion is executed on the JCh (or QMh) space, the resolution of an input image and that of an output image can be independently set, and processes optimal to the resolutions of the input and output sides can be executed.

Furthermore, since the resolution conversion method is switched according to the comparison result between the luminance value of an XYZ image of the input side and that of a low-pass image of the input side, the resolution conversion can be sped up, and the image quality of an image after the resolution conversion can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213224, filed Aug. 21, 2008, which is hereby incorporated by reference herein in its entirety.

What is claimed is:

1. A method of performing spatial color matching that converts an image of an input side under input viewing conditions into an image of an output side under output viewing conditions, which is carried out in an information processing apparatus, the method comprising the steps of:
forward-converting the image of the input side into an image in a color appearance space of a human based on the input viewing conditions including parameters, which are used to determine field sizes of an input image based on a viewing angle;
converting the image in the color appearance space into an image in the color appearance space within a color reproduction range of an output device by gamut mapping according to the color reproduction range of the output device; and
inversely converting the image in the color appearance space within the color reproduction range of the output device into the image of the output side based on the output viewing conditions including parameters, which are used to determine field sizes of an output image based on a viewing angle.

2. The method according to claim 1, wherein the parameters used to determine the field sizes of the input image based on the viewing angle include a resolution of the input image and a viewing distance.

3. The method according to claim 1, wherein the parameters used to determine the field sizes of the output image based on the viewing angle include a resolution of the output image and a viewing distance.

4. The method according to claim 1, further comprising the step of applying, to the image in the color appearance space obtained by the forward conversion, resolution conversion from a resolution of the input image into a resolution of the output image.

5. The method according to claim 1, wherein the color appearance space is a JCh (or JCH) space or a QMh (or QMH) space.

6. The method according to claim 1, further comprising the step of determining a color reproduction range of the output device for each pixel based on the output viewing conditions including the parameters, which are used to determine the field sizes of the output image based on the viewing angle.

7. The method according to claim 1, further comprising the step of applying gamut mapping according to a color reproduction range of the input image or a color reproduction range of an input device of the input image.

8. An image processing apparatus for performing spatial color matching that converts an image of an input side under input viewing conditions into an image of an output side under output viewing conditions, said apparatus comprising:
a first converter, configured to forward convert the image of the input side into an image in a color appearance space of a human based on the input viewing conditions including parameters, which are used to determine field sizes of an input image based on a viewing angle;
a second converter, configured to convert the image in the color appearance space into an image in the color appearance space within a color reproduction range of an output device by gamut mapping according to the color reproduction range of the output device; and
a third converter, configured to inversely convert the image in the color appearance space in the color reproduction range of the output device into the image of the output side based on the output viewing conditions including parameters, which are used to determine field sizes of an output image based on a viewing angle.

9. A non-transitory computer-readable medium storing a computer-executable program for causing a computer to execute a method of performing spatial color matching that converts an image of an input side under input viewing conditions into an image of an output side under output viewing conditions, the method comprising the steps of:
forward-converting the image of the input side into an image in a color appearance space of a human based on the input viewing conditions including parameters, which are used to determine field sizes of an input image based on a viewing angle;
converting the image in the color appearance space into an image in the color appearance space within a color reproduction range of an output device by gamut mapping according to the color reproduction range of the output device; and
inversely converting the image in the color appearance space within the color reproduction range of the output device into the image of the output side based on the output viewing conditions including parameters, which are used to determine field sizes of an output image based on a viewing angle.

* * * * *